United States Patent [19]
Brown et al.

[11] Patent Number: 6,149,163
[45] Date of Patent: *Nov. 21, 2000

[54] RING SEAL ASSEMBLY

[75] Inventors: Thomas Noel Brown, Barnwood; Stephen John Bowen Parker, Tewkesbury, both of United Kingdom

[73] Assignee: Dowty Aerospace Gloucester Limited, Gloucester, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/765,796

[22] PCT Filed: Jul. 6, 1995

[86] PCT No.: PCT/GB95/01600

§ 371 Date: Jan. 10, 1997

§ 102(e) Date: Jan. 10, 1997

[87] PCT Pub. No.: WO96/02776

PCT Pub. Date: Feb. 1, 1996

[30] Foreign Application Priority Data

Jul. 13, 1994 [GB] United Kingdom .................. 9414099

[51] Int. Cl.[7] ...................................... F16J 15/32
[52] U.S. Cl. .................... 277/560; 277/566; 277/916; 416/174; 416/205; 416/500
[58] Field of Search ..................... 277/560, 562, 277/565, 566, 916; 416/205, 174, 500

[56] References Cited

U.S. PATENT DOCUMENTS

| | | | |
|---|---|---|---|
| 2,841,429 | 7/1958 | McCuistion | 288/19 |
| 3,612,551 | 10/1971 | Grabill, Jr. | 277/566 |
| 3,909,076 | 9/1975 | Kato . | |
| 4,166,523 | 9/1979 | Fujii et al. | 277/916 |
| 4,660,838 | 4/1987 | Katayama et al. | 277/97 |
| 4,850,801 | 7/1989 | Valentine | 416/205 |
| 5,118,256 | 6/1992 | Violette et al. | 416/205 |
| 5,415,527 | 5/1995 | Godwin | 416/205 |
| 5,454,573 | 10/1995 | Nijland | 277/916 |
| 5,626,520 | 5/1997 | Mazziotti | 277/566 |

FOREIGN PATENT DOCUMENTS

| | | | |
|---|---|---|---|
| 0 013 203 | 7/1980 | European Pat. Off. | F16J 15/52 |
| 40 27 370 A1 | 3/1992 | Germany | F02M 61/14 |
| 601435 | 4/1978 | U.S.S.R. | F01D 11/02 |
| 929939 | 5/1982 | U.S.S.R. | F16J 15/44 |
| 2 163 498 | 2/1986 | United Kingdom | F16J 15/32 |

*Primary Examiner*—Anthony Knight
*Assistant Examiner*—John L. Beres
*Attorney, Agent, or Firm*—Marshall, O'Toole, Gerstein, Murray & Borun

[57] ABSTRACT

The sealing ring seals between relatively rotating and vibrating machine parts such as parts of an aircraft propeller, and has several sealing lands. The shape and configuration of the lands are selected so that natural vibration frequencies of the ring or lands are not vibration frequencies to which the ring is subject in use.

19 Claims, 3 Drawing Sheets

RING SEAL ASSEMBLY

FIELD OF THE INVENTION

The present invention relates to ring seals, in particular, ring seals having a plurality of sealing lands.

BACKGROUND OF THE INVENTION

Multi-landed sealing rings are known, for example, as disclosed in British patent application No. GB-A-2163498. Known ring seals suffer problems of intermittent or poor sealing contact when subjected to shocks and vibrations. Such problems typically arise in the field of aeronautics particularly in hubs of aircraft propellers.

SUMMARY OF THE INVENTION

The present invention provides an assembly comprising relatively rotating and vibrating parts and a sealing ring for sealing between the parts, the sealing ring having a plurality of sealing lands, the shape and configuration of the lands being selected so that frequencies of natural resonant vibration of at least one of the ring or lands is not a frequency of vibration applied to the ring in use. Increasing the thickness of a sealing land has the effect of increasing its resonant frequency. Furthermore, the height of the sealing lands determines the squash force, i.e. pre-compression, which the ring will experience when- forced into position between the rotating parts. Increasing the pre-compression has the effect of increasing the resonant frequency of the land away from the frequency or range of frequencies to be avoided.

The resilience of the material of which the sealing land is made can also be selected so as to ensure that the resonant frequency of the sealing ring and its lands take the desired values.

The preferred sealing ring is shaped, configured, and prestressed in situ, so that its resonant frequencies are well away from the frequencies of vibration of the rotating parts occurring during constant running. The resonant frequencies of at least one of the ring or land can also be selected so as to be away from the vibration frequencies occurring during start-up and/or shutdown of a propeller.

The preferred sealing ring has both outwardly-directed lands and inwardly-directed lands. There are more lands in one direction than the other. Preferentially, there is a greater number of lands directed outwardly, ensuring that the sealing ring rotates with the rotating outer part. Furthermore, having fewer inwardly-directed lands ensures that there is reduced friction and wear between the relatively rotating sealing ring and the inner part.

Preferably, the outwardly-directed sealing lands comprise at least one central land flanked by outer lands, the at least one central land preferably has a reduced height compared to the outer lands. In consequence, the at least one central land is less pre-compressed than the outer outwardly-directed lands when the sealing ring is fitted between propeller parts. This has the advantage of making the more central land or lands less likely to collapse, and so provides a sealing ring of increased stability. Furthermore, having a central land or lands of reduced height ensures there is less friction against the propeller outer part. This is advantageous because lubricant is less likely to reach the central lands than the outer lands.

BRIEF DESCRIPTION OF THE DRAWINGS

A preferred embodiment of the invention will now be described by way of example with reference to the drawings, in which.

BRIEF DESCRIPTION OF THE PREFERRED EMBODIMENTS

Figure 5:
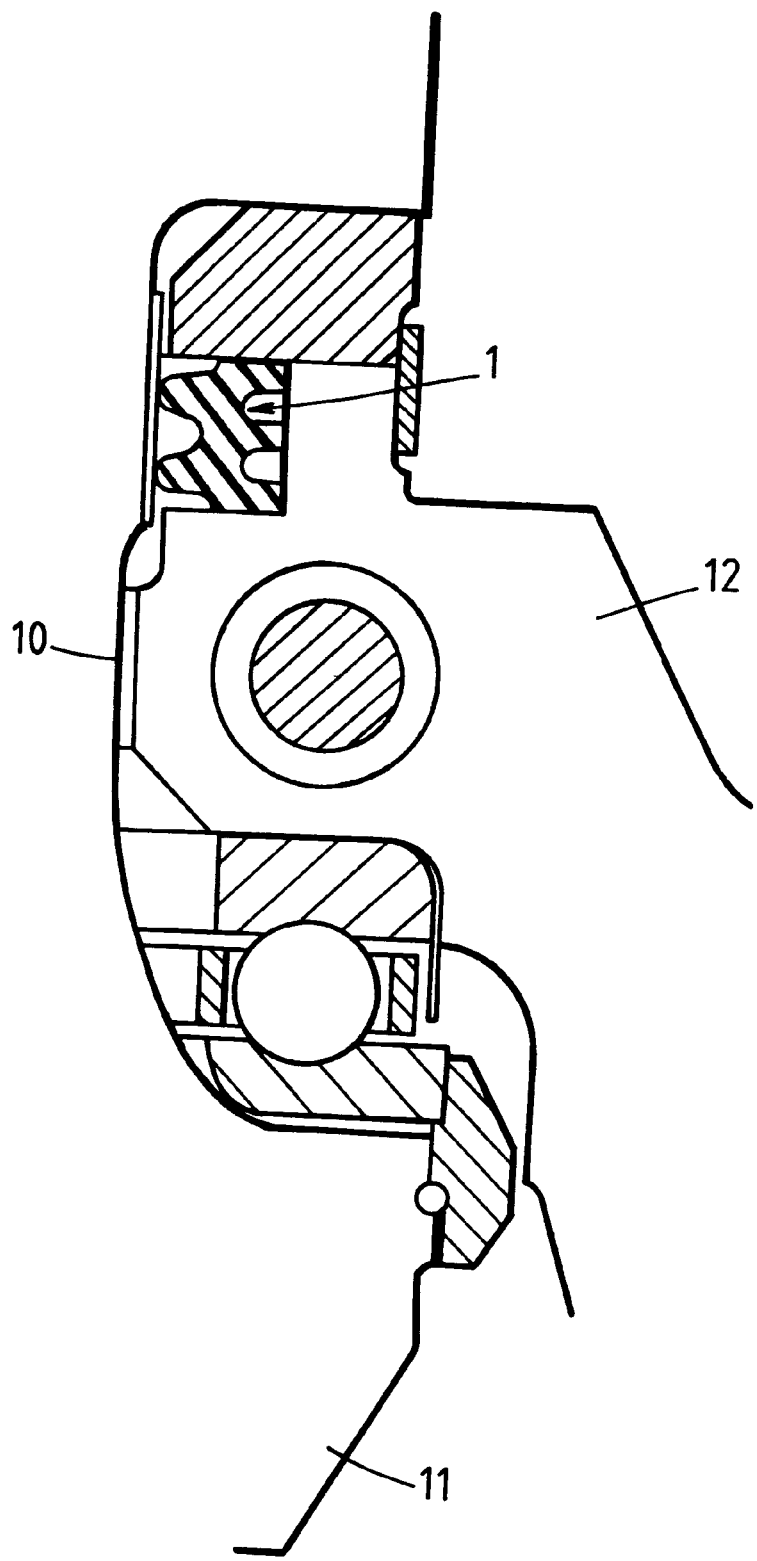
FIG. 5 is a cross-sectional view of the sealing ring shown in FIG. 4, in position with a blade root and hub port.

As shown in the figures, the sealing ring 1, which of rubber material, includes three outwardly-directed sealing lands 2,4,6 and two inwardly-directed sealing lands 3,5. Thus the sealing ring 1 has an approximate W-shaped cross-section. The heights of the sealing lands 2,3,4,5,6 are chosen so that the sealing ring 1 is appropriately pre-stressed when placed in situ between relatively rotating aircraft propeller parts as shown in FIG. 5. Specifically, the ring is held within a groove 10 of an outer propeller part 11 and the inner propeller part 12 is a rotating shaft around which the sealing ring is positioned. The outer part is a socket of a propeller hub and the inner part is a propeller blade shank. More specifically the socket is a blade root which fits in a hub port of the hub. The heights of the lands 2,3,4,5,6 are selected so that the sealing ring is appropriately pre-stressed between the inner and outer parts when placed in situ. This ensures that the resonant frequencies of the lands and ring are displaced from the usual frequencies of vibration of the propeller in use.

The thicknesses of the lands are also selected so as to be tuned away from resonance. Furthermore, the material from which the sealing ring is made is also selected so as to have an appropriate elasticity such that the ring is tuned away from resonance.

The preferred sealing ring 1 is designed for use in a propeller having a constant running speed of about 1000 revolutions per minute. Thus vibrations occur primarily at 1000/60=16.6667 Hz. The sealing ring 1 is such that the natural resonant frequencies of the sealing ring and lands are away from this frequency or harmonics thereof.

Figure 1:
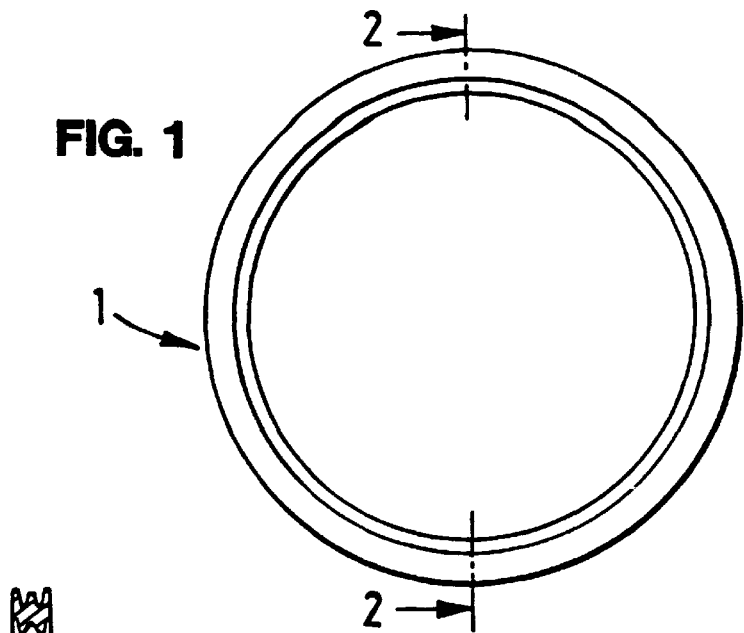
FIG. 1 is a side view of a sealing ring according to the present invention.
Figure 2:
FIG. 2 is a cross-sectional view along the line 2—2 shown in FIG. 1.
Figure 3:
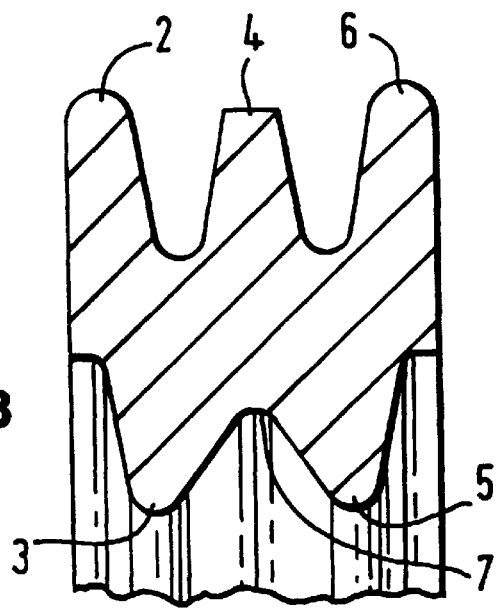
FIG. 3 is an enlarged cross-sectional view of part of the ring as shown in FIG. 2.
Figure 4:
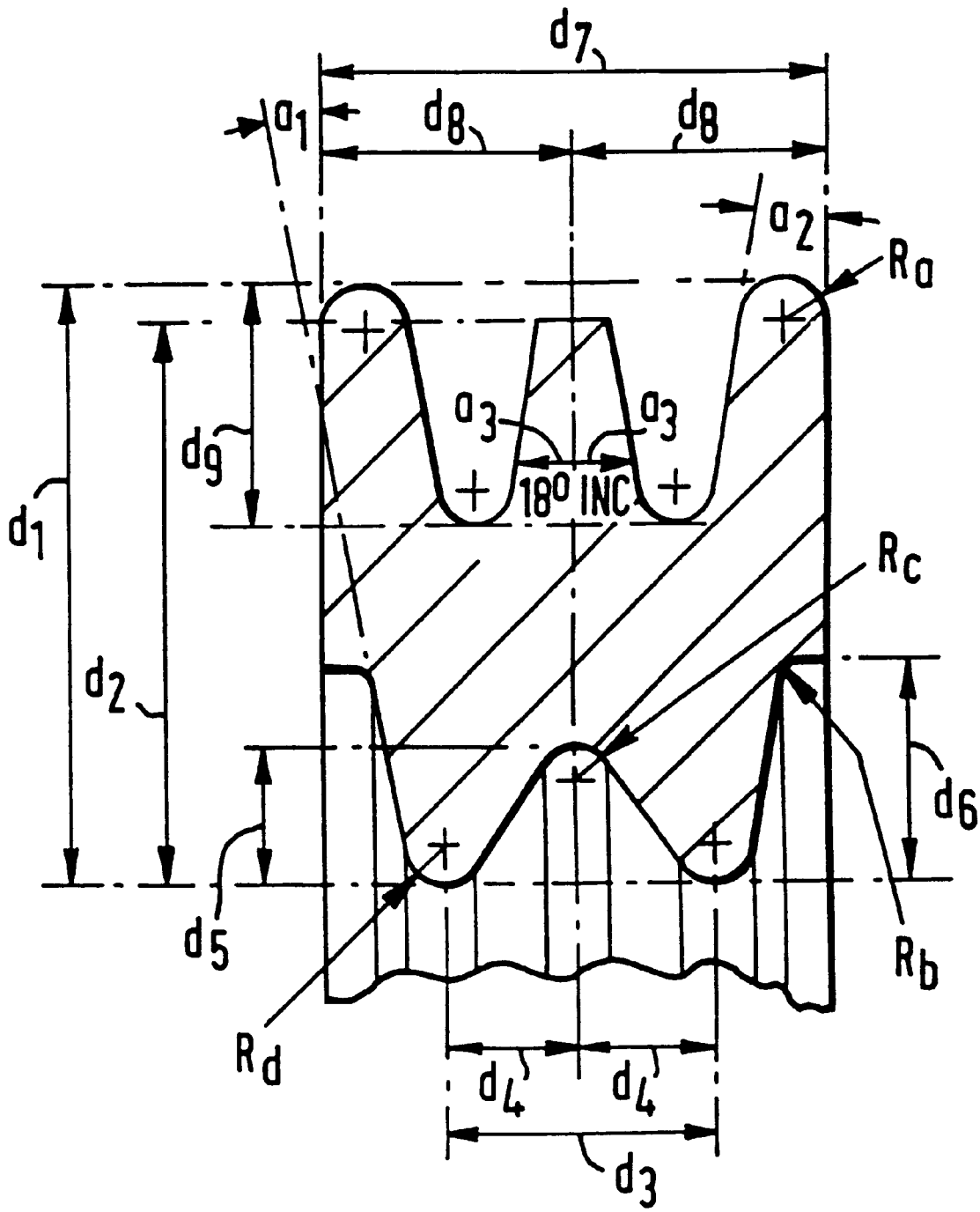
FIG. 4 is an enlarged cross-section view, showing dimensions, of the ring part shown in FIG. 3.

The preferred sealing ring 1 has an inner diameter of between 125.15 mm and 126.35 mm when unstressed. With reference to FIG. 4, other angles and dimensions of the unstressed sealing ring are as follows. In FIG. 4, a R prefix to a value denotes that the value is a radius of curvature.

| Angles/° | |
|---|---|
| $a_1$ | 10° |
| $a_2$ | 9° |
| $a_3$ | 18° |

| Dimensions/mm | |
|---|---|
| $d_1$ | 12.45 to 12.70 |
| $d_2$ | 11.75 to 12.00 |
| $d_3$ | 5.60 |
| $d_4$ | 2.80 |

-continued

| Dimensions/mm | |
| --- | --- |
| $d_5$ | 3.00 |
| $d_6$ | 4.70 |
| $d_7$ | 10.40 |
| $d_8$ | 5.20 |
| $d_9$ | 5.00 |

| Radii of Curvature/mm | |
| --- | --- |
| $R_a$ | 0.90 |
| $R_b$ | 0.35 |
| $R_c$ | 0.75 |
| $R_d$ | 0.75 |

In further embodiments of the invention, the sealing ring may be coated with tape or epoxy resin so as to provide desired frictional and wear properties.

Having three outwardly-directed sealing lands ensures good axial stability. The central land 4 is of a high reduced relative to the height of the outer lands 2,6. In consequence, the central land 4 is less stressed in use than the outer lands 2,6, so as to prevent the sealing ring collapsing under high stress. Furthermore, there is less friction between the central sealing land 4 and the outer propeller part than between the outer sealing lands 2,6 and the outer propeller part. This prevents wear of the central land 4, particularly as lubricant is more likely to reach the outer lands 2,6 and the central land 4.

Having fewer inwardly-directed lands 3,5 than outwardly-directed lands 2,4,6 provides less friction between the inner propeller part and the sealing ring 1, than the outer propeller part and the sealing ring 1. The sealing ring thus rotates with the outer part. Alternatively, a sealing ring can be provided with more inwardly-directed lands, for example, if it is intended that the sealing ring 1 should rotate with the inner propeller part.

In the preferred embodiment, the two inwardly-directed lands 3,5 are shaped so that under stress they will deform outwards rather than inwards. The region 7 of the sealing ring 1 between these two inwardly-directed lands 3,5 is shaped so as to be able to resist tensile forces. In consequence, the sealing ring 1 is resistant to damage under high stress.

The present invention is based on the realisation that a sealing ring can be provided which has its resonant frequencies tuned away from the vibrational frequencies that the ring is likely to experience in use. In consequence, many technical solutions and practical advantages will be become evident.

What is claimed is:

1. An assembly comprising relatively rotating and vibrating parts and a sealing ring for sealing between the parts, the sealing ring having a plurality of sealing lands which extend circumferentially and continuously around the sealing ring, the shape and configuration of the lands being selected so that frequencies of natural resonant vibration of at least one of the ring or the lands is not a frequency of vibration applied to the ring in use.

2. An assembly according to claim 1, in which for each sealing land, the respective frequency of natural resonant vibration is dependent on the land thickness selected.

3. An assembly according to claim 2, in which selecting an increased land thickness increases frequency of natural resonant vibration of the land.

4. An assembly according to claim 1, in which the height of the sealing lands determines the pre-compression which the ring will experience when forced into position between the rotating parts, the resonant frequencies being dependent on the sealing land heights and pre-compression selected.

5. An assembly according to claim 4, in which increasing the pre-compression has the effect of increasing the resonant frequency of a land away from the frequency or range of frequencies to be avoided.

6. An assembly according to claim 1, in which the frequencies of natural resonant vibration of at least one of the ring or lands dependent upon the resilience of the selected material of which a sealing land is made.

7. An assembly according to claim 1, in which the sealing ring is shaped, configured, and pre-compressed in situ, so that its resonant frequencies are away from the frequencies of vibration of the rotating parts occurring during constant running.

8. An assembly according to claim 1, in which the resonant frequencies of at least one of the ring or lands is selected so as to be away from the vibration frequencies occurring during at least one of start-up or shut-down.

9. An assembly according to claim 1 comprising a sealing ring housing both outwardly-directed lands and inwardly-directed lands.

10. An assembly according to claim 9, in which the sealing ring has more lands in one direction than the other.

11. An assembly comprising relatively rotating vibrating parts and a sealing ring for sealing between the parts, the sealing ring having a plurality of sealing lands, the shape and configuration of the lands being selected so that frequencies of natural resonant vibration of at least one of the ring or lands is not a frequency of vibration applied to the ring in use, the sealing ring having both outwardly-directed lands and inwardly-directed lands, the sealing ring having more lands in one direction than the other, a greater number of lands being directed outwardly so that the sealing ring rotates with the rotating part.

12. An assembly comprising relatively rotating vibrating parts and a sealing ring for sealing between the parts, the sealing ring having a plurality of sealing lands, the shape and configuration of the lands being selected so that frequencies of natural resonant vibration of at least one of the ring or lands is not a frequency of vibration applied to the ring in use, the sealing ring having both outwardly-directed lands and inwardly-directed lands, the outwardly-directed sealing lands comprising at least one central land flanked by outer lands, the at least one central land having reduced height compared to the outer lands.

13. An assembly according to claim 12, in which the at least one central land is less pre-compressed than the outer outwardly-directed lands when the sealing ring is fitted between relatively rotating parts.

14. An assembly according to claim 1, in which the relatively rotating and vibrating parts are parts of an aircraft propeller.

15. An assembly according to claim 14, in which the relatively rotating and vibrating parts comprise a shank of a propeller blade and a socket of a propeller blade hub.

16. An assembly according to claim 15, in which the blade is controllably rotatable in the socket.

17. An assembly according to claim 15, in which the socket includes a groove in which the sealing ring is held.

18. An aircraft propeller assembly comprising a hub including a plurality of sockets and propeller blades fittable therein, each blade being rotatable within and vibrating relative to its socket in use, and a sealing ring being, fitted between each blade and its respective socket, at least one sealing ring having a plurality of sealing lands which extend circumferentially and continuously around the sealing ring, the shape and configuration of the lands being selected so that frequencies of natural resonance vibration of at least one of the ring or the lands is not a frequency of vibration applied to the ring in use.

19. An aircraft propeller assembly comprising a hub including a plurality of sockets and propeller blades fittable therein, each blade being rotatable within and vibrating relative to its socket in use, and a sealing ring being fitted between each blade and its respective socket, at least on sealing ring having a plurality of sealing lands, the shape and configuration of the lands being selected so that frequencies of natural resonant vibration of at least one of the ring or lands is not a frequency of vibration applied to the ring in use, said at least one sealing ring having both outwardly-directed lands and inwardly-directed lands, the outwardly-directed lands comprising at least one central land flanked by outer lands, the at least one central land having reduced height compared to the outer lands.

* * * * *